United States Patent
Lakshmi Narayanan

(10) Patent No.: US 9,788,229 B2
(45) Date of Patent: Oct. 10, 2017

(54) METHOD AND APPARATUS FOR TRAFFIC RE-ROUTING BASED ON APPLICATION-LAYER TRAFFIC OPTIMIZATION SERVICES IN WIRELESS NETWORKS

(71) Applicant: NOKIA SOLUTIONS AND NETWORKS OY, Espoo (FI)

(72) Inventor: Ram Lakshmi Narayanan, Pleasanton, CA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/783,663

(22) PCT Filed: Apr. 9, 2013

(86) PCT No.: PCT/US2013/035797
§ 371 (c)(1),
(2) Date: Oct. 9, 2015

(87) PCT Pub. No.: WO2014/168609
PCT Pub. Date: Oct. 16, 2014

(65) Prior Publication Data
US 2016/0080967 A1 Mar. 17, 2016

(51) Int. Cl.
H04W 28/02 (2009.01)
H04L 29/08 (2006.01)
(Continued)

(52) U.S. Cl.
CPC ....... H04W 28/0226 (2013.01); H04L 67/104 (2013.01); H04W 4/12 (2013.01);
(Continued)

(58) Field of Classification Search
CPC ................ H04W 28/0228; H04W 28/0226
See application file for complete search history.

(56) References Cited

U.S. PATENT DOCUMENTS

2004/0064693 A1* 4/2004 Pabla .................. H04L 63/02
713/168
2004/0176100 A1 9/2004 Florkey et al.
(Continued)

OTHER PUBLICATIONS

International Search Report and Written Opinion dated Jun. 19, 2013 corresponding to International Patent Application No. PCT/US2013/035797.
(Continued)

Primary Examiner — Brian D Nguyen
Assistant Examiner — Toan Nguyen
(74) Attorney, Agent, or Firm — Squire Patton Boggs (US) LLP

(57) ABSTRACT

Communication systems may benefit from a naming, traffic re-routing scheme based on application-layer traffic optimization services. A method may include sending a registration request to a first network element from at least two UE and receiving a registration response from the first network element to the at least two UE. The method may include sending an application registration to a second network element from the at least two UE and receiving an application list notification from the second network element to the at least two UE. The method may include exchanging an application-level message between the at least two UE. The method may include sending a request to anchor the at least two UE traffic to a third network element and receiving a unique identifier generated from the first network element to the at least two UE. The method may include exchanging application signaling and data between the at least two UE.

11 Claims, 3 Drawing Sheets

(51) Int. Cl.
*H04W 4/12* (2009.01)
*H04W 8/00* (2009.01)
*H04W 4/20* (2009.01)
*H04W 8/02* (2009.01)
*H04W 8/18* (2009.01)
*H04W 8/26* (2009.01)

(52) U.S. Cl.
CPC .......... *H04W 4/206* (2013.01); *H04W 8/005* (2013.01); *H04W 8/02* (2013.01); *H04W 8/18* (2013.01); *H04W 8/26* (2013.01)

(56) References Cited

U.S. PATENT DOCUMENTS

| | | |
|---|---|---|
| 2010/0107092 A1 | 4/2010 | Kindberg |
| 2010/0113072 A1* | 5/2010 | Gibson ................ G06Q 20/045 455/466 |
| 2011/0230190 A1* | 9/2011 | Le Rouzic ........ H04L 29/12188 455/435.2 |
| 2011/0289172 A1* | 11/2011 | Marcellino ............. H04L 51/24 709/206 |
| 2011/0296053 A1 | 12/2011 | Medved et al. |
| 2013/0013926 A1 | 1/2013 | Hakola et al. |
| 2013/0111592 A1* | 5/2013 | Zhu ....................... G06F 21/577 726/25 |

OTHER PUBLICATIONS

"Application-Layer Traffic Optimization (alto)," Working Group—IETF, http://datatracker.ietf.org/wg/alto/charter/, pp. 1-4.

J. Seedorf et al., "Application-Layer Traffic Optimization (ALTO) Problem Statement," Network Working Group, RFC 5693, Oct. 2009, 14 pages.

S. Kiesel et al., "Application-Layer Traffic Optimization (ALTO) Requirements," Internet Engineering Task Force (IETF), RFC 6708, Sep. 2012, 20 pages.

* cited by examiner

METHOD AND APPARATUS FOR TRAFFIC RE-ROUTING BASED ON APPLICATION-LAYER TRAFFIC OPTIMIZATION SERVICES IN WIRELESS NETWORKS

BACKGROUND

Field

Certain embodiments relate to application-layer traffic optimization services in communication networks. More specifically, certain embodiments relate to a method and apparatus for naming, traffic re-routing scheme based on application-layer traffic optimization services in wireless networks.

Description of the Related Art

Application-Layer Traffic Optimization (ALTO) is being standardized at the Internet Engineering Task Force (IETF). The goal of the ALTO service is to enable peer-to-peer (P2P) network users to exchange traffic among peers within the networks, and thereby minimizing the traffic that crosses the operator network. ALTO working groups have produced several documents including problem statements and requirements, to enable ALTO service. From these requirements many things may be kept open including provisioning of topology policies, and how the P2P application itself is recognized in the operator network. The ALTO standards have identified several use cases and problems including discovery of peers, traffic-based routing, and working for real-time communications. After careful investigation of those use cases, it may be difficult to map the ALTO server infrastructure in mobile networks.

In a use case, such as inter-chat message, video conferencing, video calling, and file sharing, which are commonly used applications in fixed networks, adoption of such applications and associated the use case is increasing in mobile networks, and the traffic between two endpoints are always anchored and routed back to the core networks. However, there seems to be no optimal way to re-route traffic, and thus, transport networks are always being used for communications. In mobile networks the anchor point for traffic redirection occurs at the core of the network.

As the network is hierarchical, the network makes and allows user traffic to go only NORTH-SOUTH, and this may make the transport network congested more quickly because the traffic originates and terminates from same access network. Solutions like transport network offloading or radio network offloading may give extended benefits but these solutions make the system difficult to manage and to provide optimal traffic. Also, offloading type services are available in crowded areas, and there is no technique to minimize the growing transport network of P2P traffic. For example, the sharing of data among users is picking up in mobile networks, and the traffic originates from one UE (say UE-1) and goes to the core network and then is routed back to the same cell to another UE (say UE-2). Radio, transport, and core network are not optimized for such services, for example, transport networks get congested faster than expected.

Operators such as T-MOBILE® are deploying their own Voice Over IP (VoIP) client (or similar services) on their mobile devices, and want to improve the network utilizations. Furthermore the user does not tend to move (based on previous statistics that 85% of the time users are connected to the same cell) during an activity. If an operator wants to have optimal service then they must run the service and this is not possible with existing user base of SKYPE™, FACETIME™, GOOGLE+HANGOUTS™, and other similar applications. Operators do not have control on how, and when the users of these applications are going to communicate, and also with whom they are communicating.

Existing discovery mechanisms in the ALTO standards call for coordination and cooperation between operators, and P2P service, but these mechanisms may take a longer time. For example, these mechanisms have various shortcomings as follows. They are suitable for fixed networks, and assume that the user traffic can be re-routed within the network. Further in mobile networks, the user traffic goes to the core network and no anchoring of traffic is possible within the radio and transport networks. Also, exposing network topology and policy to P2P may have inherent security risks for which the standards have yet to address.

SUMMARY

According to a first embodiment, a method may include sending a first registration request to a first network element from a first user equipment and sending a second registration request to the first network element from a second user equipment. The method may also include receiving a registration response from the first network element to the first and the second user equipment. The method may further include sending an application registration to a second network element from the first and the second user equipment. The method may still further include receiving an application list notification from the second network element to the first and the second user equipment. The method may yet further include exchanging an application-level message between the first and the second user equipment based on the first and the second user equipment being registered and receiving the application list notification.

According to a second embodiment, an apparatus may include at least one processor and at least one memory including computer program code. Further, the at least one memory and the computer program code are configured to, with the at least one processor, cause the apparatus at least to send a first registration request to a first network element from a first user equipment and to send a second registration request to the first network element from a second user equipment. Also, the at least one memory and the computer program code are configured to, with the at least one processor, cause the apparatus at least to receive a registration response from the first network element to the first and the second user equipment. Further, the at least one memory and the computer program code are configured to, with the at least one processor, cause the apparatus at least to send an application registration to a second network element from the first and the second user equipment. Still Further, the at least one memory and the computer program code are configured to, with the at least one processor, cause the apparatus at least to receive an application list notification from the second network element to the first and the second user equipment. Also, the at least one memory and the computer program code are configured to, with the at least one processor, cause the apparatus at least to exchange an application-level message between the first and the second user equipment based on the first and the second user equipment being registered and receiving the application list notification.

According to a third embodiment, an apparatus may include sending means for sending a first registration request to a first network element from a first user equipment and sending means for sending a second registration request to the first network element from a second user equipment. The apparatus may also include receiving means for receiving a registration response from the first network element to the first and the second user equipment. The apparatus may further include sending means for sending an application registration to a second network element from the first and the second user equipment. The apparatus may still further include receiving means for receiving an application list notification from the second network element to the first and the second user equipment. The apparatus may also include exchanging means for exchanging an application-level message between the first and the second user equipment based on the first and the second user equipment being registered and receiving the application list notification.

According to a fourth embodiment, a non-transitory computer readable medium may be encoded with instruction that, when executed in hardware, perform a process. The process may include the method according to the first embodiment discussed above.

BRIEF DESCRIPTION OF THE DRAWINGS

For proper understanding of the invention, reference should be made to the accompanying drawings, wherein.

DETAILED DESCRIPTION

Certain embodiments relate to application-layer traffic optimization (ALTO) services in communication networks. More specifically, certain embodiments relate to methods and apparatuses for traffic re-routing based on ALTO services in wireless networks. Certain embodiments include a process which leverages identification schemes that may be already in place for wireless networks such as 3G and 4G. Other embodiments include a process which leverage packet processing and an IP routing entity that is closer to the user from the wireless network side and may be able to make intelligent traffic re-routing decisions via a Liquid Application Server (LAS). It should be noted that some embodiments include a process which functions without a LAS. Other embodiments include a process which eliminates around 40% of traffic that goes between NORTH-SOUTH locally. Certain embodiments include a process which integrates well to ongoing standards such as ALTO. Other embodiments include a process that is compatible to all types of cellular technology 3G and 4G. Certain embodiments include a process which can be standardized so that interoperability between a peer-to-peer (P2P) provider and device vendors without compromising security and privacy.

Certain embodiments include a process for 3G and 4G wireless infrastructure in which ALTO servers and clients can interact, and provides solutions that may address any ALTO problem statement and interface.

Other embodiments provide a technique that is secure and scalable to enable an ALTO client to use the mobile infrastructure, and at the same time benefit an operator by performing optimal traffic re-routing within the wireless networks.

Figure 1:
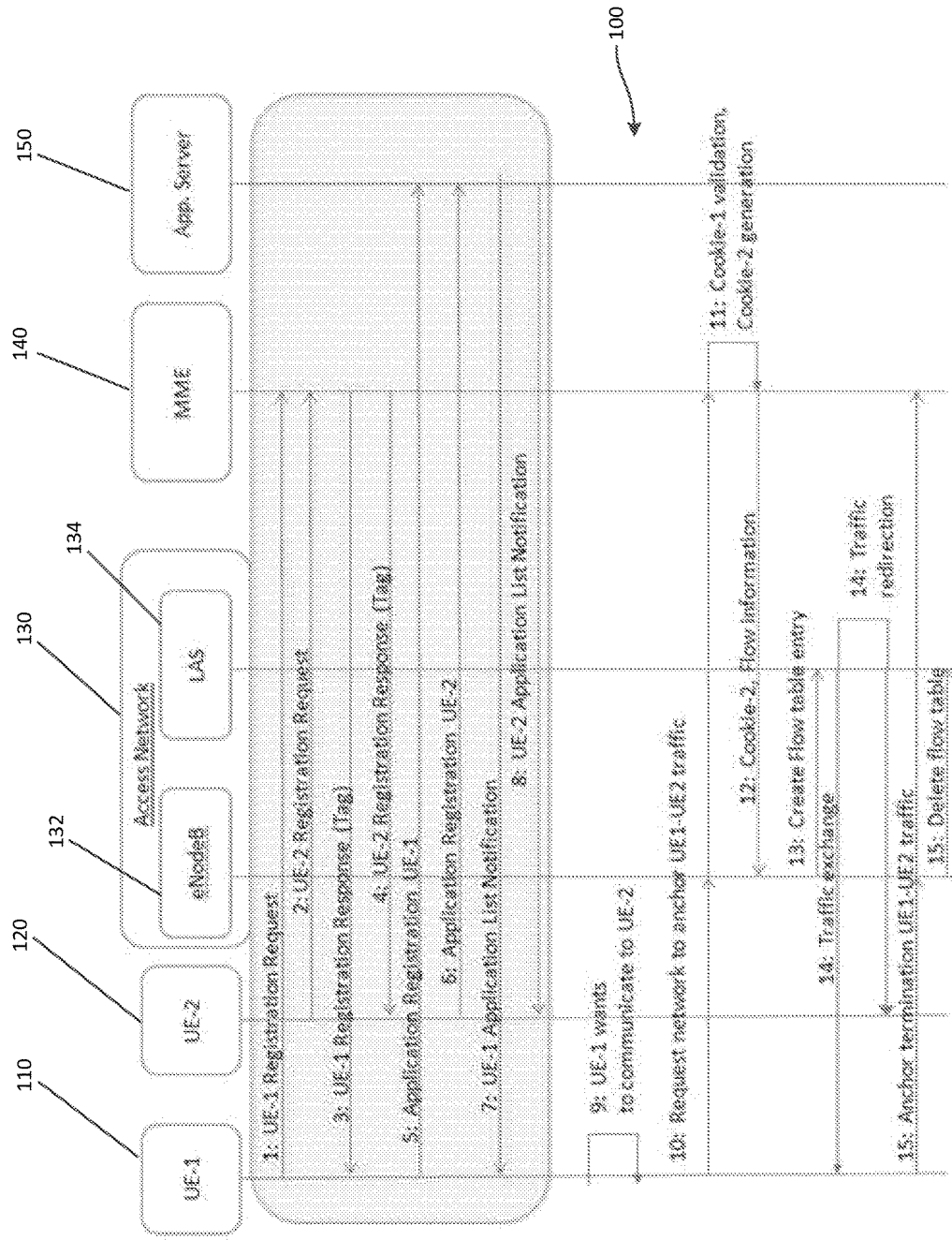
FIG. 1 illustrates traffic re-routing for application-layer traffic optimization client according to certain embodiments.

FIG. 1 illustrates traffic re-routing for application-layer traffic optimization client according to certain embodiments. In FIG. 1, a signaling flow diagram 100 shows two users, User-A and User-B, for purposes of illustration only these users are using UE 110 and UE 120 devices respectively and running ALTO enabled clients. Both UEs (110, 120) perform registration (1) and (2) through their application service provider (ASP) 150 or via operator hosted service (OHS) and then exchange application level data directly. As an example, use cases that can be visualized are P2P download, Web real-time communication, and Voice or Video over IP communication. FIG. 1 illustrates the sequence of message exchange that may occur between both UEs (110, 120) that are behind the same wireless access network/Mobility Management Entity (MME) 140 and access network 130 while accessing the ALTO based services.

Registration Service

As shown in FIG. 1, in certain embodiments, UE 110 sends a registration request to wireless network/MME 140 as part of Location Update/Attach (this is a standard 3GPP complaint registration request) at message-1. Also, UE 120 sends a registration request to wireless network/MME 140 as part of Location Update/Attach at message-2. It should be noted that both UEs (110, 120) are behind the same wireless network/MME 140.

MME 140 (or any other suitable entity) may be actively involved during the Attach procedure. MME 140 may be configured to generate a tag to UE 110 at the end of Attach procedure, and MME 140 forwards the tag to UE 110 at message-3. The tag contains two portions, a first portion contains UE-Identification and a second portion contains a unique identifier, for example, say cookie-1. The first portion of the tag contains a UE Identifier, for example, a Globally Unique Temporary Identity (GUTI). This identification is already part of the Attach procedure, and the same is communicated in this step. The second portion of the tag contains cookie-1, which may be issued by the MME 140 or access network 130 to the UEs (110, 120) and the tag is verified by the network when the UEs (110, 120) present it for communication. In this embodiment, the message may be part of the Location Update (LU) procedure response and it is possible to have such tag generation when the UEs (110, 120) are performing a Radio Access Bearer (RAB) request. Either one or both of these mechanisms (LU, RAB) are possible.

Message-4 is similar to that of message-3, and UE 120 may be configured to receive the message from MME 140. These tags may be stored internally by UEs (110, 120) like any other identifiers and can be made available to ALTO client via OS API inside the UEs (110, 120).

At message-5, UE 110 may perform an application registration with application service provider (ASP) 150, for example in the case of VoIP application or download service application, ASP 150 may process login/password, and then may process the IP address or other information from UEs (110, 120). The UEs (110, 120) supply the opaque tag information that they received from wireless network/MME 140 with application server 150. Opaque tag contains cookie-1 that may mainly be used to identify the network that the users are currently attached to. The issuing network may generate the cookie by preserving the privacy of the user, and not exposing the internal network topological structure.

Message-6 is similar to message-5, and UE 120 may perform the application registration.

At message-7, UE 110 after successfully completing the registration, may receive the list of tags that was part of the group (for certain P2P applications).

At message-8, UE 120 after successfully completing the registration, may receive the list of tags that was part of the group (for certain P2P application). UE 120 at this stage may receive a tag for UE 110 and UE 110 may also receive UE 110 tag (not shown). By way of example, message-7 and message-8 are shown for VoIP type communication, however, there may be other P2P communication where both message-7 and message-8 may not be present, and explicit requests can be made to resolve the remote peers via ASP 150.

Service Usage

As shown in FIG. 1, at message-9, when both UE 110 and UE 120 are successfully registered and received each other's tag as part of presence information, and when UE 110 wants to exchange application level message with UE 120, for example VoIP call, then UE 110 internally checks for UE 120's first portion of tag identification and matches with UE 110's internal tag and once matched, UE 110 "knows" that both UEs (110, 120) are behind the same access point or same network. As the Globally Unique Mobility Management Entity Identifier (GUMMEI) matches that of its own operator and learns that the remote endpoint is locally routable.

At message-10, having learned that UE 120 is behind the same access network, UE 110 requests eNodeB 132 with a Request for Authority to Negotiate (RAN) request and supplies UE-2 120's identification tag and request MME 140 to anchor the traffic locally.

It should be noted that for illustration purposes only, RAB message has been used in FIG. 1, however, a server that maintains the GUTI and unique identifier (cookie) association and is made available to all UE's (110, 120) in the access network can be used within the scope of certain embodiments.

At message-11, MME 140, upon receiving the request, verifies whether the cookie for UE 120 is correct, and it was generated by MME 140, and then MME 140 generates another unique identifier, for example, cookie-2. Then MME 140 performs paging to UE 120, (not shown) and passes cookie-2 to UE 120. So that UE 110 if it wants to get authentication may be able to use this temporary unique identifier, say cookie-2 as well. There are several other example use purposes for cookie-2, such as, (a) cookie-2 may be used as a seed for session keys between two UE 110 and UE 120 or (b) cookie-2 may contain time sensitive information and may be used by eNodeB to allow direct communication between UE 110 and UE 120 only for that time.

At message-12, MME passes cookie-2 to eNodeB 132 (optional Live Access Server (LAS) 134), along with flow information.

At message-13, eNodeB 132 forwards to LAS 134 (if present), to act as an anchor point for such traffic between UE 110 and UE 120 and eNodeB 132 creates a flow table entry. From this point on LAS 134 may forward all traffic re-routing functions. However, in certain embodiments, if there is no LAS 134 present, the eNodeB 132 after receiving IP packets from UE 110 may put in UE 120 output queue, and the same occurs for the packets that come from UE 120 to UE 110.

At message-14, application signalling and data transfer (traffic) exchange and redirection may occur between two UEs (110, 120) with LAS 134 being optional.

At message-15, the Lifetime of the session is controlled either by tear down of the RAB session or by explicit Transmission Control Protocol (TCP) termination, or time out session, anchor termination, etc. Next, eNodeB 132 (or LAS 134) removes the session from its flow table.

Figure 2:
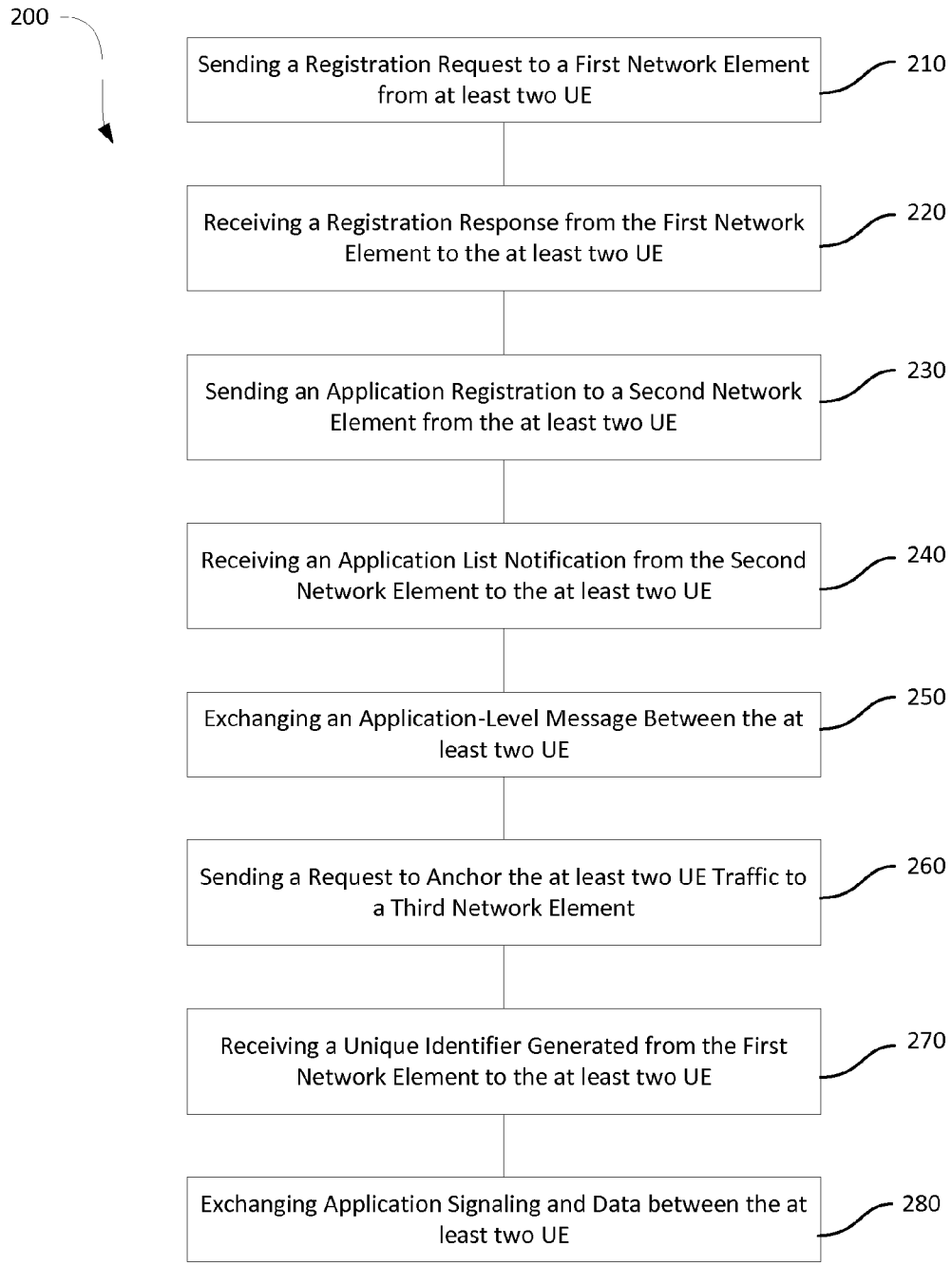
FIG. 2 illustrates a flow diagram of a method according to certain embodiments.

FIG. 2 illustrates a flow diagram of a method according to certain embodiments. At step 210, the method may include sending a registration request to a first network element from at least two UE.

At step 220, the method may also include receiving a registration response from the first network element to the at least two UE.

At step 230, the method may further include sending an application registration to a second network element from the at least two UE.

At step 240, the method may still further include receiving an application list notification from the second network element to the at least two UE.

At step 250, the method may include exchanging an application-level message between the at least two UE.

At step 260, the method may also include sending a request to anchor the at least two UE traffic to a third network element.

At step 270, the method may further include receiving a unique identifier generated from the first network element to the at least two UE.

At step 280, the method may still further include exchanging application signaling and data between the at least two UE.

Figure 3:
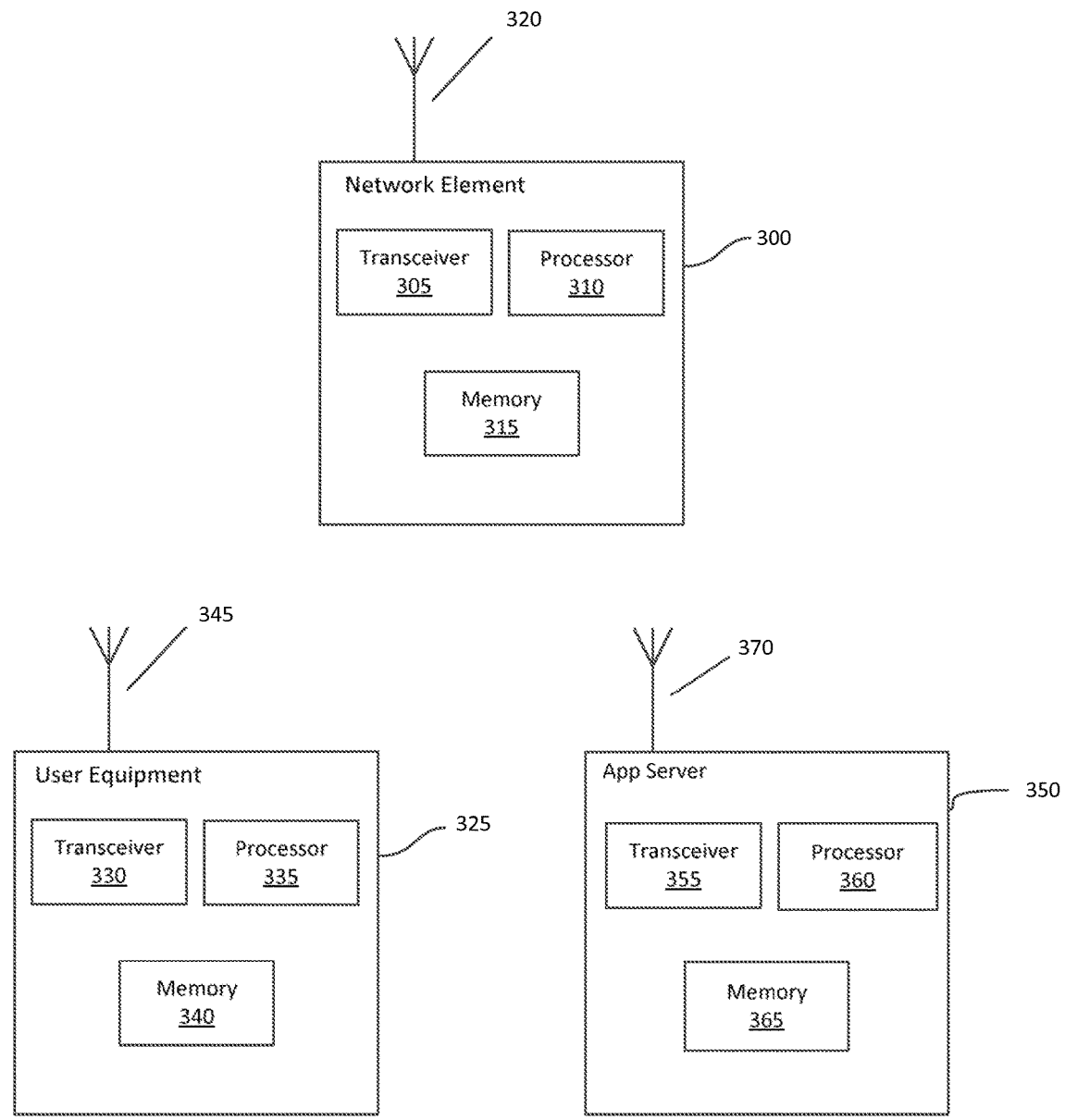
FIG. 3 illustrates a block diagram of a system according to certain embodiments.

FIG. 3 illustrates a block diagram of a system according to certain embodiments. In one embodiment, a system may comprise several devices, such as, for example, network element 300, user equipment 325, and an App Server 350. Network element 300 may correspond to access network 130, shown in FIG. 1. The system may comprise more than network element, user equipment, or App Server, although only one of each is shown for the purposes of illustration. Network element 300 may be an eNodeB or MME, as shown in FIG. 1. User equipment 325 may be any Internet-connected device, such as a tablet computer, mobile phone, smart phone, laptop computer, desktop computer, personal digital assistant (PDA) or the like. App Server 350 may be any application service provider (ASP) or the like.

Each of the devices in the system may comprise at least one processor, respectively indicated as 310, 335, and 360. At least one memory may be provided in each device, and indicated as 315, 340, and 365, respectively. The memory may comprise computer program instructions or computer code contained therein. One or more transceiver 305, 330, and 355 may be provided, and each device may also comprise an antenna, respectively illustrated as 320, 345, and 370. Although only one antenna each is shown, many antennas and multiple antenna elements may be provided to each of the devices. Other configurations of these devices, for example, may be provided. For example, network element 300, user equipment 325, and App Server 350 may be additionally or solely configured for wired communication and in such a case antennas 320, 345, and 370 may illustrate any form of communication hardware, without being limited to merely an antenna.

Transceivers 305, 330, and 355 may each, independently, be a transmitter, a receiver, or both a transmitter and a receiver, or a unit or device that may be configured both for transmission and reception.

Processors 310, 335, and 360 may be embodied by any computational or data processing device, such as a central processing unit (CPU), application specific integrated circuit (ASIC), or comparable device. The processors may be implemented as a single controller, or a plurality of controllers or processors.

Memories 315, 340, and 365 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and may be processed by the processors may be any suitable form of computer program code, for example, a compiled or interpreted computer program written in any suitable programming language.

The memory and the computer program instructions may be configured, with the processor for the particular device, to cause a hardware apparatus such as network element 300, user equipment 325, and ASP 350, to perform any of the processes described above (see, for example, FIG. 1). Therefore, in certain embodiments, a non-transitory computer-readable medium may be encoded with computer instructions that, when executed in hardware, may perform a process, such as one of the processes described herein. Alternatively, certain embodiments of the invention may be performed entirely in hardware.

Thus, in certain embodiments, MME 140 is leveraged part of the ALTO Server and thus eliminates the need for a separate entity. Other embodiments include a process and apparatus which with a negotiation scheme between the ALTO Client and the network may enable traffic routed within eNodeB 132 or between eNodeB 132, and thus avoid the use of GTP tunnelling for traffic within eNodeB 132. This may result in a tremendous saving with regard to transport bandwidth and interactive communication and may further enable such services.

Alternatively, in some embodiments, the same techniques may be adopted between two eNodeBs (not shown) managed by MME 140, and between two MMEs (not shown). Further, to increase the location privacy, secured techniques can be applied, with different encoding schemes based on the above described framework. In addition, when Legal interception is enabled for the user or session, then intelligent routing traffic can be disabled or routed back to the LIG framework.

Thus, certain embodiments may improve user experience and encourage mobile users to utilize the bandwidth for such service. Moreover, certain embodiments may provide extended ALTO server and client use case for the mobile environment. Other embodiments may provide a 50% transport capacity savings for sessions that are behind the same eNodeB. Furthermore, core network may be relieved from the top 5 traffic applications and savings in transport bandwidth for huge file transfer type applications, and P2P may result.

In some embodiments, there are no additional entities required, such as a separate ALTO Server being needed. Further, Quality of Service (QoS) can be enabled by providing only a few elements such as eNodeB 132 (and LAS 134) resulting in an easy to implement and deploy process and apparatus.

In other embodiment, a wireless specific tagging process/scheme enables secured communications resulting in trusted anchors and a controlled routing based on traffic and user policy.

Certain embodiments overcome the existing standards solutions, where policy and routing definitions are not clear, resulting in an environment where it may be difficult for legal interceptions to occur. Further, certain embodiments are backward compatible with legal interception.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

LIST OF ABBREVIATIONS

UE User Equipment
MME Mobility Management Entity
ALTO Application Layer Traffic Optimization
LU Location Update procedure
ASP Application Service Provider
P2P Peer-to-Peer communication
GUTI Globally Unique Temporary Identity
GUMMEI Globally Unique Mobility Management Entity Identifier
LAS Liquid Application Server
RAB Radio Access Bearer
RAN Request for Authority to Negotiate

I claim:

1. A method, comprising:
sending a first registration request to a mobility management entity from a first user equipment;
sending a second registration request to the mobility management entity from a second user equipment;
receiving a registration response from the mobility management entity to the first and the second user equipment, wherein the registration response includes a tag which comprises a first portion including user equipment identification and a second portion including unique identifiers for the first and the second user equipment generated by the mobility management entity;
sending an application registration to an application server from the first and the second user equipment;
receiving an application list notification from the application server to the first and the second user equipment;
exchanging an application-level message between the first and the second user equipment based on the first and the second user equipment being registered and receiving the application list notification; and
sending a request to anchor the first and the second user equipment traffic locally.

2. The method of claim 1,
wherein the request to anchor the first and the second user equipment traffic locally is a request to anchor the first and the second user equipment traffic to a third network element.

3. The method of claim 1, further comprising:
exchanging application signaling and data between the first and the second user equipment.

4. The method of claim 1, further comprising:
sending a request to terminate local anchoring of the first and the second user equipment traffic.

5. The method claim 1, wherein the unique identifiers comprise of cookies.

6. A non-transitory computer readable medium encoded with instructions that, when executed in hardware, perform a process, the process comprising the method according to claim 1.

7. An apparatus, comprising:
at least one processor; and at least one memory including computer program code, wherein the at least one memory and the computer program code are configured to, with the at least one processor, cause the apparatus at least to send a first registration request to a mobility management entity from a first user equipment;

send a second registration request to the mobility management entity from a second user equipment;

receive a registration response from the mobility management entity to the first and the second user equipment, wherein the registration response includes a tag which comprises a first portion including user equipment identification and a second portion including unique identifiers for the first and the second user equipment generated by the mobility management entity;

send an application registration to an application server from the first and the second user equipment;

receive an application list notification from the application server to the first and the second user equipment;

exchange an application-level message between the first and the second user equipment based on the first and the second user equipment being registered and receiving the application list notification; and send a request to anchor the first and the second user equipment traffic locally.

8. The apparatus of claim 7, wherein the request to anchor the first and the second user equipment traffic is a request to anchor the first and the second user equipment traffic to a third network element.

9. The apparatus of claim 7, the at least one memory and the computer program code are configured to, with the at least one processor, cause the apparatus at least to:

exchange application signaling and data between the first and the second user equipment.

10. The apparatus of claim 7, the at least one memory and the computer program code are configured to, with the at least one processor, cause the apparatus at least to:

send a request to terminate local anchoring of the first and the second user equipment traffic.

11. The apparatus of claim 7, wherein the unique identifiers comprise of cookies.

\* \* \* \* \*